United States Patent [19]
Driggers

[11] 3,870,093
[45] Mar. 11, 1975

[54] TIRE CHAIN HOLDER AND DISPENSER

[76] Inventor: Louis A. Driggers, 7800 78th Ave., S.E., Mercer Island, Wash. 98040

[22] Filed: June 28, 1973

[21] Appl. No.: 374,346

[52] U.S. Cl. .................................. 152/213, 81/15.8
[51] Int. Cl. ........................................... B60c 27/00
[58] Field of Search ................ 152/213 R, 214, 215; 81/15.8; 224/46 R

[56] References Cited
UNITED STATES PATENTS

| | | | |
|---|---|---|---|
| 1,489,963 | 4/1924 | Pearre | 152/215 |
| 2,566,396 | 9/1951 | Andrews | 152/214 |
| 2,925,843 | 2/1960 | Cox | 152/213 R |
| 2,946,365 | 7/1960 | Timson | 152/213 R |

Primary Examiner—Drayton E. Hoffman
Attorney, Agent, or Firm—Christensen, O'Connor, Garrison & Havelka

[57] ABSTRACT

A tire chain holder and dispenser is constructed from a horizontally disposed base member and a pedestal affixed thereto and extending upwardly therefrom. The pedestal is sized to accomodate a tire chain having elongate side chains interconnected by spaced cross chains wherein the side chains are stacked in an accordian folded manner along the lateral sides of the pedestal while the cross chains are alternately stacked on opposite ones of the longitudinal sides of the pedestal.

1 Claim, 7 Drawing Figures

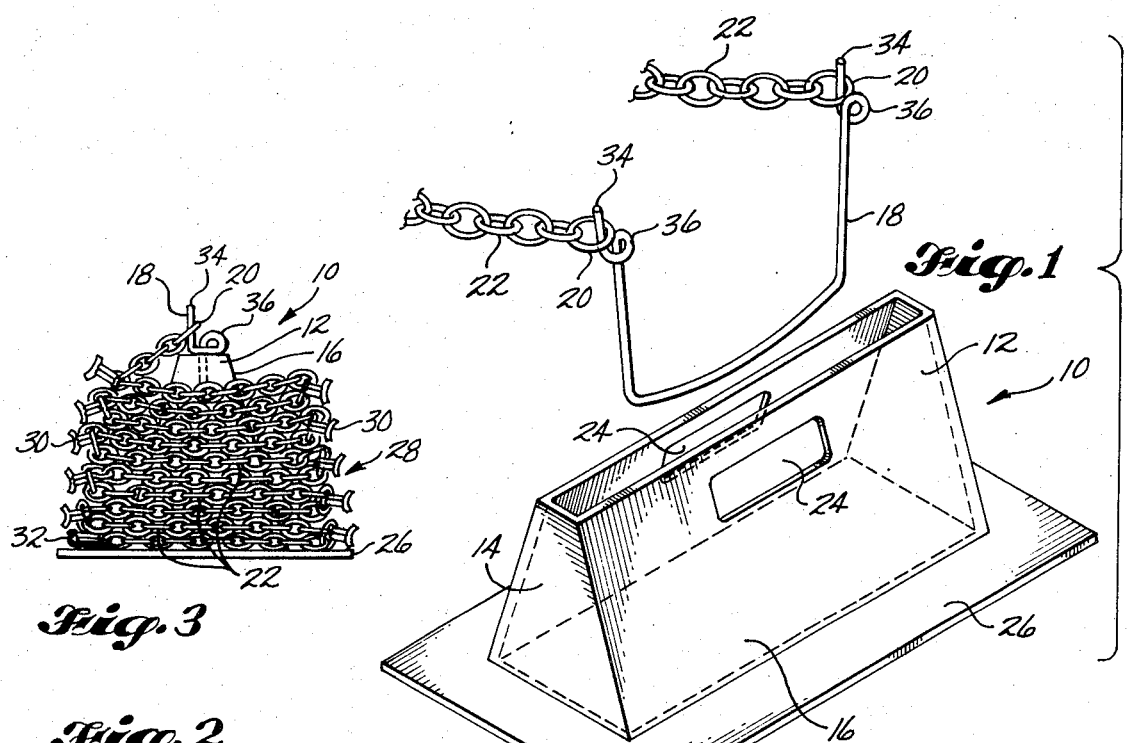
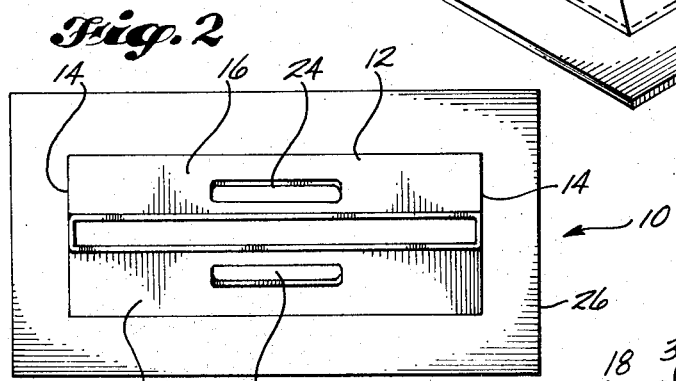
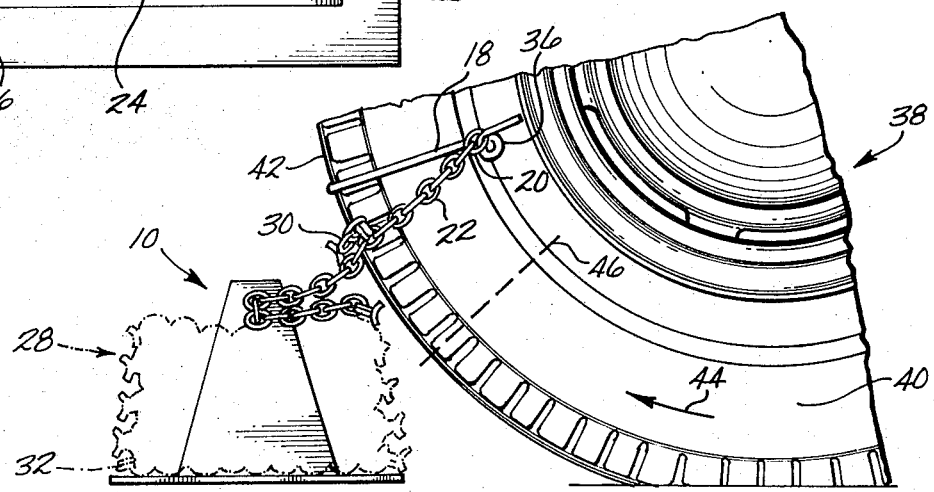

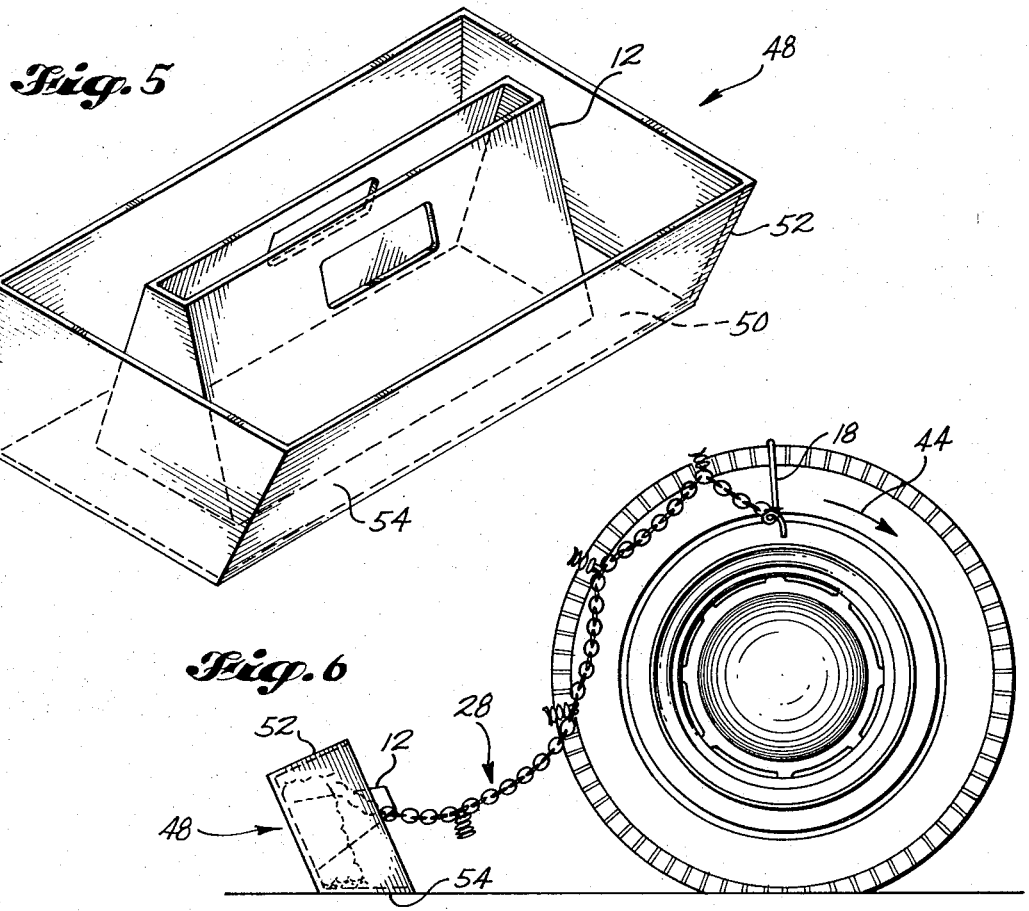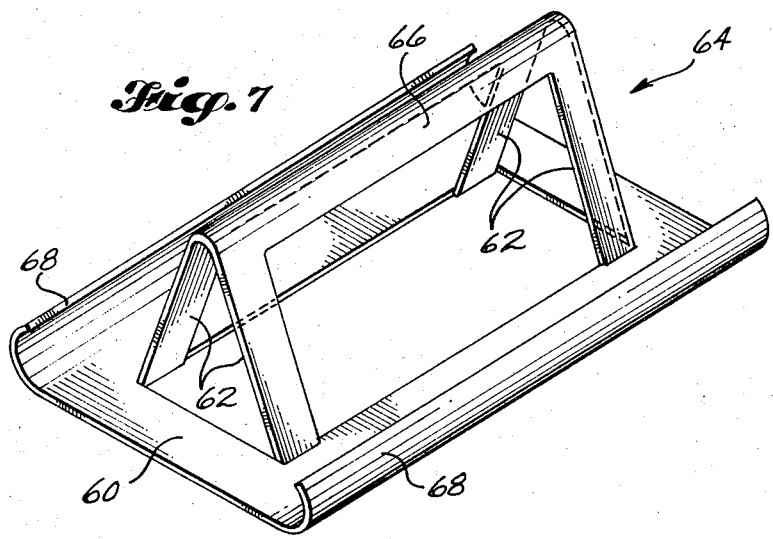

3,870,093

TIRE CHAIN HOLDER AND DISPENSER

BACKGROUND OF THE INVENTION

The present invention relates to tire chain holding and dispensing devices and to a method for using such devices.

Objects of the present invention are to provide a device for compactly storing tire chains for stowing in a motor vehicle trunk; to provide such a device which holds a tire chain in a manner for immediate use; to provide such a device which holds and dispenses a tire chain onto a vehicle wheel in a manner which prevents self-entanglement of the chain during application of the chain to a vehicle tire; to provide such a device which minimizes tire chain handling by the owner; to provide such a device which is simple and easy to use; and to provide such a device which is economical to manufacture.

SUMMARY OF THE INVENTION

The present invention provides a method for using a device for holding and dispensing automobile tire chains. The device comprises a relatively horizontally disposed base member that supports the weight of a tire chain thereon, a pedestal means mounted on and extending upwardly from the base member, and a handle means connected to the base member for carrying the apparatus. The pedestal means has at least four corner portions spaced from each other, between which are defined two upright lateral sides and two upright longitudinal sides. The method for using this device comprises placing first end portions of each of the side chains on the base means along respectively opposite lateral sides of the pedestal means, thereafter placing a first cross chain on the base means along a first longitudinal side of the pedestal means, and thereafter placing a subsequent portion of each of the side chains between adjacent cross-links along respectively opposite ones of the lateral sides of the pedestal means to stack the side chains in an accordion manner, and at the same time serially placing subsequent cross chains along alternate ones of the longitudinal sides of the pedestal means.

BRIEF DESCRIPTION OF THE DRAWINGS

A better understanding of the present invention can be derived by reading the ensuing specification in conjunction with the accompanying drawings wherein:

FIG. 1 is an isometric view of the preferred embodiment of the tire chain holder and dispenser of the present invention;

FIG. 2 is a plan view of the tire chain holder and dispenser shown in FIG. 1;

FIG. 3 is an end view of the tire chain holder and dispenser shown in FIGS. 1 and 2 with a tire chain installed on the device;

FIG. 4 illustrates the device shown in FIGS. 1, 2 and 3, as it appears while performing its dispensing function;

FIG. 5 is an isometric view of an alternate embodiment of the tire chain holder and dispenser;

FIG. 6 illustrates the tire chain holder and dispenser shown in FIG. 5 as it appears while performing its dispensing function; and FIG. 7 is an isometric view of another embodiment of the present invention.

DESCRIPTION OF PREFERRED EMBODIMENTS

FIGS. 1 and 2 illustrate the basic structure of a holder and dispenser for motor vehicle tire chains. The holder 10 can be constructed of heavy sheet metal or molded fiberglas or plastic. A main feature of the holder 10 is an elongated central pedestal 12, a central upright member formed in the shape of a frustum of a pyramid having end faces 14 and opposingly inclined side faces 16. If desired, the end faces can be oriented vertically with respect to the generally horizontally disposed base plate 26. The upper end of the pedestal has an opening therein formed by the upper portions of the end and side faces of the pedestal to accommodate a spring clamp 18 (of the type known in the prior art) which retains the free end links 20 of the longitudinal side chains 22 of a conventional tire chain. Elongated openings 24 in the inclined side faces 16 of the pedestal 12 provide hand holes for manipulating, lifting and transporting the holder. The pedestal 12 is mounted on a base plate 26 which describes a broad flange of generally horizontal configuration extending outwardly from the bottom of the pedestal 12. The dimensions of the holder can vary with chain size since the spanwise dimensions of the lateral traction links and overall side chain lengths varies from truck size to those sizes used with compact passenger vehicles. It should be noted, however, that mechanically adjustable holders which can accommodate any size of chain assembly are within the purview of this invention.

Referring to FIG. 3 a tire chain assembly 28 is shown installed on the holder 10. The chain assembly rests on the upper surface of the base plate 26 about the bottom peripheral portion of the pedestal 12 and is installed so that the two longitudinal side chains 22 reside in a series of Z-folds along the two respective vertical end faces 14 of the central pedestal 12. The lateral traction links 30 seat along the inwardly sloping or angled sides 16 of the pedestal 12 and are installed in an alternating manner as the accordian or Z-fold of the side chains 22 is formed. The four corner portions of the pedestal provide spacing to hold the chain neatly and compactly in an accordian folded relationship ready for immediate and trouble free dispensing and tire placement.

The ends of the side chains 22, which include latch mechanisms 32, are installed on the holder 10 first allowing the free link ends 20 of the side chains 22 to be accessible at the top of the holder. The free links 20 on the side chains 22 are engaged by ends 34 of the spring clamp 18 as shown in FIGS. 1 and 3 and are retained by loops 36 on the clamp. When the ends 20 of the side chains 22 are attached to the clamp 18 in this manner, the clamp 18 can be inserted through the opening in the top of the pedestal 12 and stored in the interior thereof. Thus, the tire chain 28 is portably stored on the holder 10 in a compact, orderly manner ready for immediate use.

The chain 28 on the holder 10 is placed in use as shown in FIG. 4. The holder is placed on the ground behind a traction wheel 38 of a motor vehicle such that the traction links 30 are presented to the tire 40 athwart the tread 42. The spring clamp 18, with free links 20 attached, is then withdrawn from the opening in the top of the pedestal 12 and is installed on the tire 40 at an elevation immediately above the chain holder 10. The spring properties of the clamp 18 allow the cross-section of the tire to be firmly grasped across the tread, thus fixing the position of the clamp on the tire. With the clamp 18 in place, the first traction link 30 of the chain to be drawn from the holder 10, is positioned roughly adjacent to the tread 42. After this preparation, the vehicle is slowly driven in a forward direction such that the wheel 38 rotates as indicated by arrow 44. The previously attached spring clamp 18 rotates with the tire 40 and serially unfolds the chain 28 from the holder 10. As the clamp 18 rotates through the 12 o'clock position, the chain is automatically draped in place on the tire by its own weight. As the clamp 18 rotates from the 3 o'clock position through the 6 o'clock position, the chain is held to the tire by the clamp and the tire passes over the first one or two traction links 30. Rotation is continued until the spring clamp reaches the approximate position indicated by dotted line 46 at which point the vehicle is stopped. With the clamp 18 thus positioned the entire chain has been drawn from the holder and positioned on the tire while the ends of the side chains 22 terminating with the latch mechanisms 32 are positioned roughly adjacent to the free links 20 of the side chain 22 attached to the clamp 18. At this point the clamp is removed from the tire and disengaged from the free links 20 on the side chains 22. At this time the opposite ends of the side chains 22 are interconnected via the latches 32 thus completing installation of the chain on the tire. The holder is subsequently stored in the vehicle with the spring clamp installed in the opening in the top of the pedestal 12.

The chains are removed from the vehicle tires in a conventional manner. Reinstallation of the chain assembly 28 on the holder 10 is accomplished by first positioning the latch mechanisms 32 on the side chains 22 on the flange of the base 26 adjacent the corners of one of the vertical end faces 14 of the pedestal 12. The side chains 22 are then Z-folded such that the traction links 30 are serially positioned along alternate ones of the sloping faces 16 of the pedestal 12. When the Z-folding of the chain assembly 28 is complete the free links 20 on the ends of the side chains 22 are looped over the respective ends 34 of the spring clamp 18 which protrude from the opening in the top of the pedestal 12.

An alternate embodiment of the tire chain holder and dispenser 48 is illustrated in FIGS. 5 and 6. In this embodiment the central pedestal 12 is mounted on the floor 50 of a box structure 52. The box structure retains loose segments of the chains when resting about the pedestal 12. One side, 54, of the box structure 52, is inclined at an angle to enhance the operation of the device as a dispenser. When the holder 48 is placed on the ground behind the rear wheel 38, such that it is resting on the inclined side 54 of the box structure 52, the pedestal 12 is positioned at a suitable angle for dispensing of the chain. As the wheel is rotated in the direction indicated by the arrow 44, the chain is dispensed from the holder and is installed on the tire in a manner similar to that previously described for the preferred embodiment.

Referring now to FIG. 7, a third embodiment of the invention, a base member 60 has four upstanding corner members 62 of a pedestal 64 attached thereto. Two of the corner members 62 adjacent each lateral end of the base member 60 are angled inwardly toward each other and are connected by a longitudinal bar 66 running longitudinally across the top of the pedestal 64. Each of the longitudinal sides 68 of the base member 60 are turned upwardly in an arc to provide a leading edge on the base member. This leading edge allows the chain holding and dispensing device to be used more effectively to dispense chains when snowy conditions are encountered. Thus when the device with a chain stored thereon is positioned behind a vehicle wheel and the tire chain is fixed to the wheel, as by a clamp 18, the device can slide along the snow covered terrain on its base without pulling or piling up significant amounts of snow as the vehicle and wheel move forwardly.

The present invention has been described in relation to a preferred embodiment and alternatives thereof. It is understood that one of ordinary skill in the art can make various alterations, substitutions of equivalents, and other changes to the device as disclosed without departing from the original concept. It is therefore intended that the present invention be limited only by the definition contained in the appended claims.

What is claimed is:

1. A method for storing tire chains on a dispensing device, said tire chains having side chains and cross chains interconnecting said side chains, said device including a relatively horizontally disposed base member for supporting the weight of a tire chain thereon, a pedestal means mounted on and extending upwardly from said base member, said pedestal means having at least four corner portions between which are defined at least two upright lateral sides and at least two upright longitudinal sides, and handle means connected to said device for carrying said device, the method comprising:

placing a first portion of each of said side chains on said base means along respectively opposite ones of said lateral sides of said pedestal means, said first portion of each of said side chains being mutually adjacent ends of said side chains, placing a first cross chain on said base means along a first longitudinal side of said pedestal means, thereafter placing a subsequent portion of each of said side chains between adjacent crosslinks along respectively opposite ones of the lateral sides of said pedestal means to stack said side chains in an accordion manner and serially placing subsequent cross chains along alternate ones of said longitudinal sides of said pedestal means.

* * * * *